United States Patent [19]

Phillips et al.

[11] Patent Number: 5,271,235
[45] Date of Patent: Dec. 21, 1993

[54] HIGH EFFICIENCY ABSORPTION CYCLE OF THE GAX TYPE

[75] Inventors: Benjamin A. Phillips, Benton Harbor; Thomas S. Zawacki, St. Joseph, both of Mich.

[73] Assignee: Phillips Engineering Company, St. Joseph, Mich.

[21] Appl. No.: 793,644

[22] Filed: Nov. 18, 1991

Related U.S. Application Data

[63] Continuation-in-part of Ser. No. 668,198, Mar. 12, 1991, abandoned.

[51] Int. Cl.$^5$ .............................................. F25B 15/00
[52] U.S. Cl. ................................. 62/101; 62/476; 62/238.3; 62/497; 62/485; 62/141
[58] Field of Search .................. 62/101, 112, 114, 105, 62/141, 148, 238.3, 476, 483, 485, 487, 495, 497

[56] References Cited

U.S. PATENT DOCUMENTS

| | | | |
|---|---|---|---|
| 1,854,223 | 4/1932 | Randel | 62/483 |
| 2,979,923 | 4/1961 | Bury | 62/476 |
| 3,046,756 | 7/1962 | Whitlow et al. | 62/483 |
| 3,055,194 | 9/1962 | Fink | 62/476 |
| 3,236,064 | 2/1966 | Whitlow | 62/476 |
| 3,254,507 | 6/1966 | Whitlow | 62/476 |
| 3,323,323 | 6/1967 | Phillips | 62/101 |
| 3,353,369 | 11/1967 | Whitlow | 62/494 |
| 3,357,203 | 12/1967 | Briggs | 62/489 |
| 3,357,688 | 12/1967 | Whitlow | 261/114 |
| 3,367,137 | 2/1968 | Whitlow | 62/497 |
| 3,367,310 | 2/1968 | Whitlow et al. | 122/367 |
| 3,390,544 | 7/1968 | Eberz | 62/476 |
| 3,394,926 | 7/1968 | Whitlow et al. | 261/140 |
| 3,407,625 | 10/1968 | McDonald | 62/476 |
| 3,410,104 | 11/1968 | Hopkins | 62/483 |
| 3,423,951 | 1/1969 | Eisberg | 62/101 |
| 3,466,893 | 9/1969 | Phillips et al. | 62/101 |
| 3,481,150 | 12/1969 | English | 62/85 |
| 3,483,710 | 12/1969 | Bearint | 62/476 |
| 3,491,551 | 1/1970 | Frohbieter | 62/476 |
| 3,491,552 | 1/1970 | Roeder, Jr. | 62/476 |
| 3,509,732 | 5/1970 | Roeder, Jr. | 62/476 |
| 3,517,522 | 6/1970 | Ozono et al. | 62/476 |
| 3,527,060 | 9/1970 | Kruggel | 62/476 |
| 3,527,061 | 9/1970 | Kruggel | 62/476 |
| 3,566,615 | 3/1971 | Roeder, Jr. | 62/511 |
| 3,584,975 | 6/1971 | Frohbieter | 417/203 |
| 3,626,716 | 12/1971 | Leonard, Jr. | 62/476 |
| 3,638,452 | 2/1972 | Kruggel | 62/495 |
| 3,639,087 | 2/1972 | Frohbieter | 417/572 |
| 3,641,784 | 2/1972 | Schlichtig | 62/489 |
| 3,690,121 | 9/1972 | Patel | 122/33 |
| 3,693,373 | 9/1972 | Gable | 122/33 |
| 3,717,007 | 2/1973 | Kuhlenschmidt | 62/476 |
| 3,750,416 | 8/1973 | Kuhlenschmidt | 62/116 |
| 3,895,499 | 7/1975 | Hopkins | 62/105 |
| 3,990,264 | 11/1976 | Patnode et al. | 62/476 |
| 4,031,712 | 6/1977 | Costello . | |
| 4,106,309 | 8/1978 | Phillips | 62/495 |
| 4,127,009 | 11/1978 | Phillips | 62/497 |
| 4,127,010 | 11/1978 | Phillips | 62/101 |

(List continued on next page.)

OTHER PUBLICATIONS

International Journal of Refrigeration, vol. 9, No. 6, Nov. 1986, pp. 326–333, Scharfe et al., "Analysis of Advantages and Limitations of Absorber-Generator Heat Exchange."

(List continued on next page.)

Primary Examiner—John Sollecito
Attorney, Agent, or Firm—Finnegan, Henderson, Farabow, Garrett & Dunner

[57] ABSTRACT

A high-efficiency, enhanced, generator-absorber heat exchange (EnGAX) cycle, particularly useful in gas-fired, air-cooled absorption heat pumps, increases the heat output of the absorber in the temperature overlap range with the generator to equal the heat usable by the generator. This is accomplished by establishing a solution pathway from a portion of the absorber in the temperature overlap region to a portion of the generator in order to increase solution flow in the high temperature regions of the absorber and generator. Further improvements in cycle efficiency are obtainable by increasing the operating pressure of the absorber.

56 Claims, 12 Drawing Sheets

U.S. PATENT DOCUMENTS

| | | | |
|---|---|---|---|
| 4,127,993 | 12/1978 | Phillips | 62/485 |
| 4,171,619 | 10/1979 | Clark | 62/101 |
| 4,193,268 | 3/1980 | Phillips | 62/487 |
| 4,207,751 | 6/1980 | Kampfenkel et al. | 62/141 |
| 4,209,364 | 6/1980 | Rothschild | |
| 4,237,701 | 12/1980 | Holldorff | 62/495 |
| 4,246,761 | 1/1981 | Phillips et al. | 62/148 |
| 4,285,211 | 8/1981 | Clark | 62/476 |
| 4,299,093 | 11/1981 | Cohen et al. | 62/489 |
| 4,311,019 | 1/1982 | Rojey et al. | 62/114 |
| 4,329,851 | 5/1982 | Bourne | 62/148 |
| 4,337,625 | 7/1982 | Wilkinson | 62/101 |
| 4,383,416 | 5/1983 | Phillips | 62/476 |
| 4,410,134 | 10/1983 | Heimbach et al. | 62/483 |
| 4,445,340 | 5/1984 | Reimann | 62/141 |
| 4,454,724 | 6/1984 | Erickson | 62/112 |
| 4,463,570 | 8/1984 | Kantner | 62/101 |
| 4,467,623 | 8/1984 | Reimann | 62/494 |
| 4,475,361 | 10/1984 | Alefeld | 62/476 |
| 4,476,694 | 10/1984 | Kunugi | 62/497 |
| 4,485,638 | 12/1984 | Reimann | 62/489 |
| 4,505,133 | 3/1985 | Malewski et al. | 62/476 |
| 4,526,009 | 7/1985 | van der Sluys et al. | 62/324.2 |
| 4,531,374 | 7/1985 | Alefeld | 62/79 |
| 4,534,180 | 8/1985 | Yasuda et al. | 62/141 |
| 4,542,628 | 9/1985 | Sarkisian et al. | 62/335 |
| 4,542,629 | 9/1985 | Biermann | 62/476 |
| 4,545,217 | 10/1985 | Nakao et al. | 62/495 |
| 4,546,620 | 10/1985 | Biermann | 62/476 |
| 4,563,295 | 1/1986 | Erickson | 252/69 |
| 4,567,736 | 2/1986 | van der Sluys et al. | 62/494 |
| 4,580,407 | 4/1986 | Aime et al. | 62/238.3 |
| 4,593,531 | 6/1986 | Fujimoto | 237/2 B |
| 4,596,122 | 6/1986 | Kantner | 62/141 |
| 4,646,541 | 3/1987 | Reid, Jr. et al. | 62/238.3 |
| 4,665,711 | 5/1987 | Page | 62/238.3 |
| 4,691,525 | 9/1987 | Gelderloos | 62/101 |
| 4,691,532 | 9/1987 | Reid et al. | 62/483 |
| 4,706,464 | 11/1987 | Kreutmair | 62/148 |
| 4,718,243 | 1/1988 | Buschulte et al. | 62/141 |
| 4,719,767 | 1/1988 | Reid, Jr. et al. | 62/324.2 |
| 4,722,193 | 2/1988 | Purvis et al. | 62/81 |
| 4,724,679 | 2/1988 | Radermacher | 62/101 |
| 4,732,008 | 3/1988 | DeVault | 62/79 |
| 4,735,065 | 4/1988 | Vinz | 62/476 |
| 4,742,687 | 5/1988 | Reid et al. | 62/112 |
| 4,742,693 | 5/1988 | Reid, Jr. et al. | 62/238.3 |
| 4,763,488 | 8/1988 | Johnston | 62/497 |
| 4,770,005 | 9/1988 | Alefeld | 62/467 |
| 4,827,728 | 5/1989 | DeVault et al. | 62/332 |
| 4,846,240 | 7/1989 | Erickson | 159/24.2 |
| 4,894,998 | 1/1990 | Kaneko et al. | 62/148 |
| 4,921,515 | 5/1990 | Dao | 62/335 |
| 4,926,659 | 5/1990 | Christensen et al. | 62/495 |
| 4,938,028 | 7/1990 | Murray | 62/108 |
| 4,966,007 | 10/1990 | Osborne | 62/488 |
| 4,966,014 | 10/1990 | Erickson | 62/476 |
| 4,967,566 | 11/1990 | Bergmann et al. | 62/101 |
| 5,016,444 | 5/1991 | Erickson | 62/238.2 |
| 5,024,063 | 6/1991 | Erickson | 62/335 |
| 5,033,274 | 7/1991 | Erickson | 62/476 |
| 5,038,574 | 8/1991 | Osborne | 62/335 |
| 5,050,392 | 9/1991 | Messmer et al. | 62/121 |
| 5,050,403 | 9/1991 | Maier-Laxhuber | 62/480 |
| 5,097,676 | 3/1992 | Erickson | 62/476 |

OTHER PUBLICATIONS

B. A. Phillips; "Analyses of Advanced Residential Absorption Heat Pump Cycles"; Proceedings of DOE/ORNL Heat Pump Conference, Washington, D.C.; Dec. 11–13, 1984; pp. 265–287.

B. A. Phillips; "High Efficiency Absorption Cycles for Residential Heating and Cooling"; Intersociety Energy Conversion Eng. Conference, Miami Beach, Florida; Aug. 18–23, 1985; pp. 2.229–2.234.

B. A. Phillips: "A New Future for Absorption?"; ASHRAE Journal; Nov. 1986; pp. 38–42.

B. A. Phillips; "Progress and Problems in Recent Research on Absorption Cycles and Fluids"; U.S.–Israel Workshop, Washington, D.C.; Apr. 23–24, 1987; pp. 89–93.

B. A. Phillips; "Development of an Advanced-Cycle Absorption Heat Pump for Residential Applications"; Proceedings of 2nd DOE/ORNL Heat Pump Conference, Washington, D.C., Apr. 17–20, 1988; pp. 111–116.

B. A. Phillips; "Development of an Advanced-Cycle Absorption Heat Pump for Residential Applications"; Proceedings of the 2nd DOE/ORNL Heat Pump Conference, Washington, D.C., Apr. 17–20, 1988; Document prepared by ORNL for DOE, published Aug. 1988.

B. A. Phillips; "High Efficiency Absorption Cycles for Residential Heating and Cooling"; pp. 1–6.

B. A. Phillips; "Development of a Gas Fired Heat Pump with an Improved Absorption Cycle"; ASME Winter Annual Meeting, Nov. 27–Dec. 2, 1988, Chicago, Illinois.

Columbia Double-Effect Absorption Gas Heat Pump, Market and Technology Prospectus; Columbia Gas System Services Corp. Columbus, Ohio, Feb., 1990.

B. A. Phillips; "Development of a High Efficiency, Gas Fired, Absorption Heat Pump for Residential and Small Commercial Applications Phase I, Analysis of Advanced Cycles and Selection of the Preferred Cycle"; Oct., 1984, pp. 1–57 and 2 cover sheets.

HIGH EFFICIENCY ABSORPTION CYCLE OF THE GAX TYPE

BACKGROUND OF THE INVENTION

This invention relates generally to refrigeration and heat pump equipment and particularly to an absorption refrigeration cycle of the generator-absorber-heat-exchange type. The invention is especially adapted for use in gas-fired, absorption heat pumps. The present invention is a continuation-in-part of application Ser. No. 07/668,198, filed on Mar. 12, 1991, now abandoned. The present invention was developed with support from the Federal Government and as such, the Government has certain rights in the invention.

The potential energy saving benefits of heat activated heat pumps for medium temperature heating and cooling functions, including space heating and cooling, have been known. For example, the air conditioning of residential and commercial structures is a large user of electrical energy. The natural-gas-fired heat pump has the ability to slow the requirement for the addition of electrical generating capacity by supplanting such electrically-operated systems. In addition, an alternative is provided to the use of CFC's as a working fluid, which CFC's are considered to be harmful to the environment. Furthermore, in its heating made, the absorption heat pump has the potential of reducing the gas usage to half that of a state-of-the-art gas furnace and to match the primary energy-efficiency of a good electric air conditioner in the cooling mode.

In order to realize its potential, for general application across the United States, it has been determined that an air-to-air residential and small commercial absorption heat pump system should operate at a coefficient of performance (COP) at ARI rating conditions approaching 1.8 in the heating mode and 0.9 in the cooling mode, based on gas-firing at flue efficiencies of 90 percent or greater and using the high heating value of the gas. It is additionally deemed desirable for such system to be capable of meeting the total heat requirements of a building without supplemental heat, under a full range of operating conditions, including outside ambient air temperatures of as low as $-10°$ F.

While water-cooled absorption cycles used in large scale industrial and commercial applications have been devised that meet or exceed these cooling COP's, such water-cooled cycles and their fluids do not meet those COP's in air-to-air applications, nor are they suited for the low outdoor temperatures. In order to be commercially successful in the residential and small commercial applications, a natural-gas-fired heat pump must be an air-to-air system and free from undue complexities and have a predicted lifetime of 20 years or greater. Furthermore, all applicable codes and standards must be met.

The present inventor has evaluated known absorption cycles and has determined that one cycle having the potential for meeting the above requirements is the generator-absorber heat-exchange (GAX) cycle. The GAX cycle is a further refinement on the absorber heat-exchange (AHE) cycle, which uses absorber heat to warm the strong solution of absorbent and refrigerant and utilizes the sensible heat of the weak solution as heat input to the generator. Such AHE cycles have been used in ammonia/water air conditioner production units for at least twenty-five years and have been found to have gas-fired COP's of up to 0.5 at ARI rating conditions. This cycle has also been used in experimental gas-heat pumps to produce heating COP's of 1.25. In the AHE cycle, the recuperation of absorber heat is limited by the sensible heat of the strong solution. Similarly, recuperation heating of the generator is limited to the sensible heat in the weak solution leaving the generator.

The GAX cycle adds to the recuperation gains of the AHE cycle by increasing the absorber and generator temperature ranges so that the two temperature ranges overlap. Under these conditions, absorption heat is transferred to the generator at the overlap temperatures using various means such as a separate heat transfer loop. This heat transfer can occur whenever the weak solution concentration is decreased to the point that the temperature of the hot end of the absorber is above that of the cool end of the generator. All of the heat of absorption in the overlap range can be utilized by the generator, except for heat-transfer temperature differences. By increasing the extent of overlap between the temperature ranges of the absorber and generator, improved system COP's may be obtained. Therefore, the need exists for ways to increase the extent of overlap between the temperature range of the generator and the temperature range of the absorber, and to increase the heat of absorption in the absorber overlap range.

Hybrid systems have been proposed in which absorption systems are augmented with mechanical compressors. However, such systems merely reflect combinations of alternate forms of energy inputs to the system, without greatly altering the overall COP of the system. One such system is proposed in U.S. Pat. No. 5,024,063 to Erickson which discloses the use of a mechanical compressor on the vapor outlet of an absorption system generator to elevate the temperature at which thermal energy may be transferred from the condenser to the surroundings.

In the known prior system, a heat pump 10 operated on the generator-absorber heat-exchange (GAX) principle provides low-pressure refrigerant vapor leaving evaporator 12 through conduit 14 to enter absorber 16 where it is absorbed in a weak solution of absorbent and refrigerant, such as ammonia and water (FIG. 1). This process takes place at temperatures above that of the surroundings, generating heat. A lower temperature portion of that heat is transferred to a coolant (for example a water-antifreeze mixture) circulating during this process in a heat exchanger 18. The strong absorbent-/refrigerant solution is then transferred by a solution pump 20 to the generator 22, where a higher pressure is maintained. Refrigerant vapor is driven from the solution in generator 22 as a result of heat transfer from a high temperature source 24, which is assisted by the additions of heat transfer fins 45. The refrigerant vapor is expelled from generator 22 through conduit 26 to a condenser 28 where it is condensed and fed through an expansion valve 30 and expanded in evaporator 12. The weak solution is returned through conduit 32 to absorber 16. At very low outdoor temperatures heat may be transferred in a liquid heat exchanger (not shown) between the strong solution conduit 36 and the weak solution conduit 38. In accordance with the AHE cycle principle, absorber heat is also used to warm the strong solution at 40, and the sensible heat of the weak solution is provided as a heat input to a section of the generator at lower temperature 42. In addition, as disclosed in detail in U.S. Pat. No. 4,127,010 issued to the present inventor, entitled HEAT ACTIVATED HEAT PUMP METHOD AND APPARATUS, the disclosure of which is hereby incorporated herein by reference, additional efficiencies may be gained by exchanging heat between the strong solution conduit 36 and the refrigerant/absorbant vapor mixture at 44 and by providing a pre-cooler 46 to transfer condensate heat to the refrigerant vapor and excess liquid.

In the case of the generator-absorber heat transfer function, illustrated in FIG. 1, the high temperature heat transfer is performed by a GAX heat transfer means 48, including, for example, a pair of heat exchange coils 50 and 52 and a pump 54 to circulate heat-transfer fluid such as pressurized water. Because the vertical temperature gradients of absorber 16 and generator 22 are reversed, it is necessary to cross-connect the lines between coils 50 and 52, as illustrated in FIG. 1. The transfer of GAX heat from the absorber to the generator can be accomplished in various ways. The transfer should be provided over the full overlap temperature range. The principle of the GAX cycle is illustrated in the pressure-temperature-composition diagram of FIG. 2 in which line C-G represents the low temperature portion of the absorber, line G-F the high temperature portion of the absorber, line D-I the low temperature portion of the generator and line I-E the high temperature portion of the generator. Points A and B represent the condenser and evaporator, respectively. The line from C to D represents the strong solution pathway and line from E to F the weak solution pathway. The temperature overlap between the G to F region of the absorber and the D to I region of the generator provides the generator-absorber heat-exchange as illustrated by the arrows, indicating heat transfer.

SUMMARY OF THE INVENTION

The purpose of the present invention is to provide a new high-efficiency, enhanced, GAX cycle (EnGAX) which achieves a significant improvement in COP with respect to the known GAX cycle. This is accomplished by increasing the extent of overlap of operating temperature ranges in an absorber and generator of a GAX absorption system and by increasing the absorption in the overlap area of the absorber. The invention may be embodied in an absorption heat pump including a generator, a condenser, an evaporator, an absorber, a strong solution pathway from a low temperature portion of the absorber to the generator, and a weak solution pathway from the generator to a high-temperature portion of the absorber. A refrigerant pathway is provided from the generator to the condenser, from the condenser to the evaporator and from the evaporator to the absorber. A GAX heat transfer pathway is provided between regions of the absorber and generator having overlapping temperatures.

According to one aspect of the invention, the temperature range overlap may be increased by elevating the absorber operating pressure. This may be accomplished by locating a vapor compressor in the vapor stream between the evaporator and the absorber, to increase the operating pressure of the absorber. According to another aspect of the invention, means are provided for increasing the flow of absorbent/refrigerant solution in the temperature overlap region of the absorber and in a portion of the generator in order to increase the absorber heat output in the overlap range. This enhanced cycle is capable of enlarging the overlap range and of providing all of the heat that the generator can utilize in the overlap range and, therefore, provides an improvement in performance over the basic GAX cycle.

According to yet another aspect of the invention, a GAX cycle is provided that operates to a peak generator temperature of approximately 500 Fahrenheit. This may be accomplished by providing a ternary working fluid that includes ammonia, water, and a dissolved salt. Not only does this aspect of the invention produce an increase in cycle COP of a GAX cycle by increasing the overlap range, it produces an unexpectedly large enhancement due to the solution concentrations in the overlap range when combined with other aspects of the invention.

Although the invention is illustrated embodied in a gas-fired residential heat pump, its principles apply to use with other sources of heat and to other refrigeration and chemical processes. These and other objects, advantages and features of this invention will become apparent upon review of the following specification in conjunction with the drawings.

DESCRIPTION OF THE PREFERRED EMBODIMENT

As used herein, the terms weak absorption solution and strong absorption solution refer to the concentration of the refrigerant in the solution. Thus a weak absorption solution has less absorbed refrigerant, such as ammonia, and more absorbent, such as water, than a strong absorption solution. Also, the term absorption heat pump, as used herein, is intended to include any apparatus that transforms heat between low, medium and high temperature states and is intended to include not only the commonly understood meaning of the term, but also is intended to include heat transformers as well as more traditional uses such as refrigeration and related processes.

Figure 1:
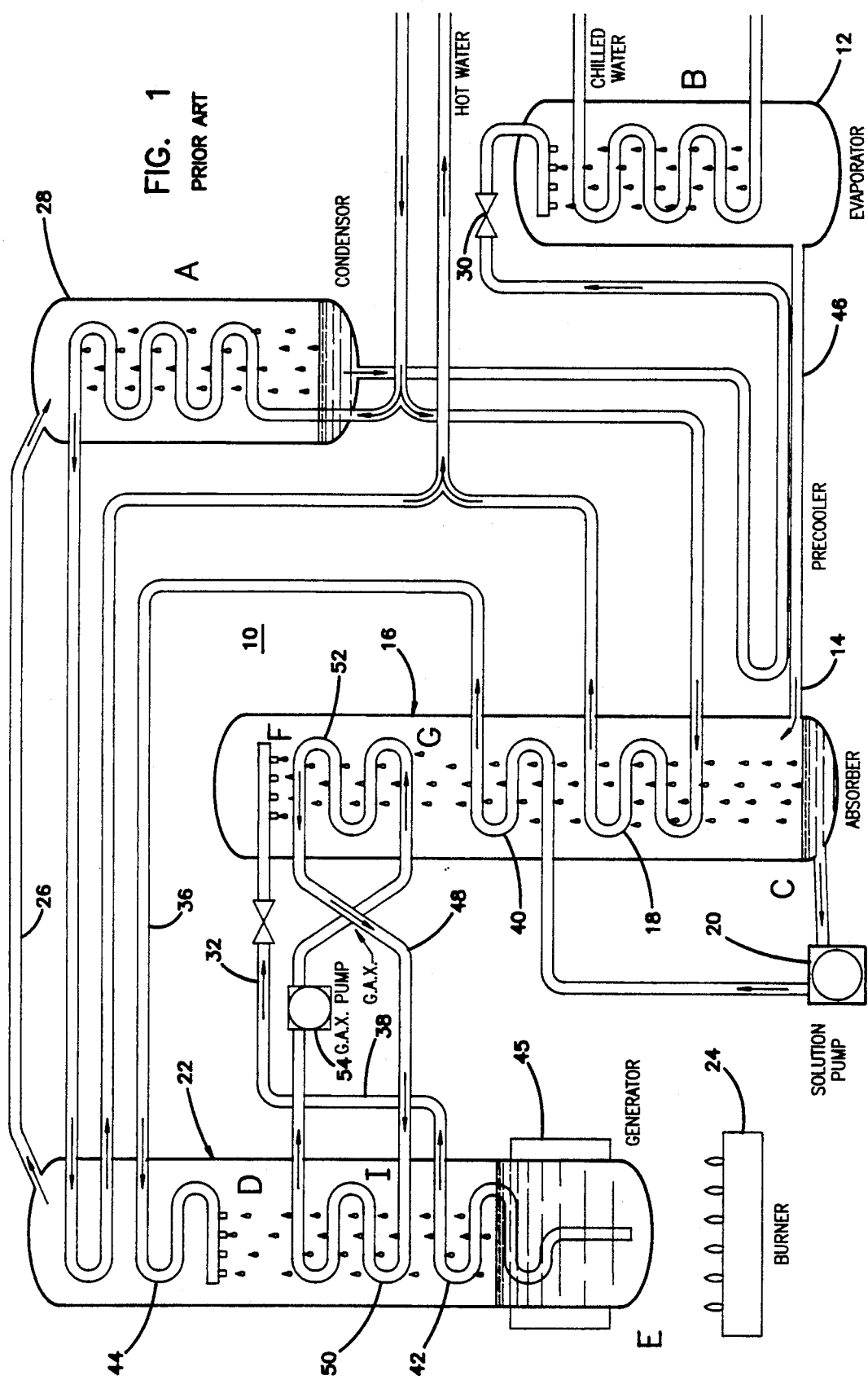
FIG. 1 is a flow diagram illustrating a conventional generator-absorber heat-exchange (GAX) cycle.
Figure 2:
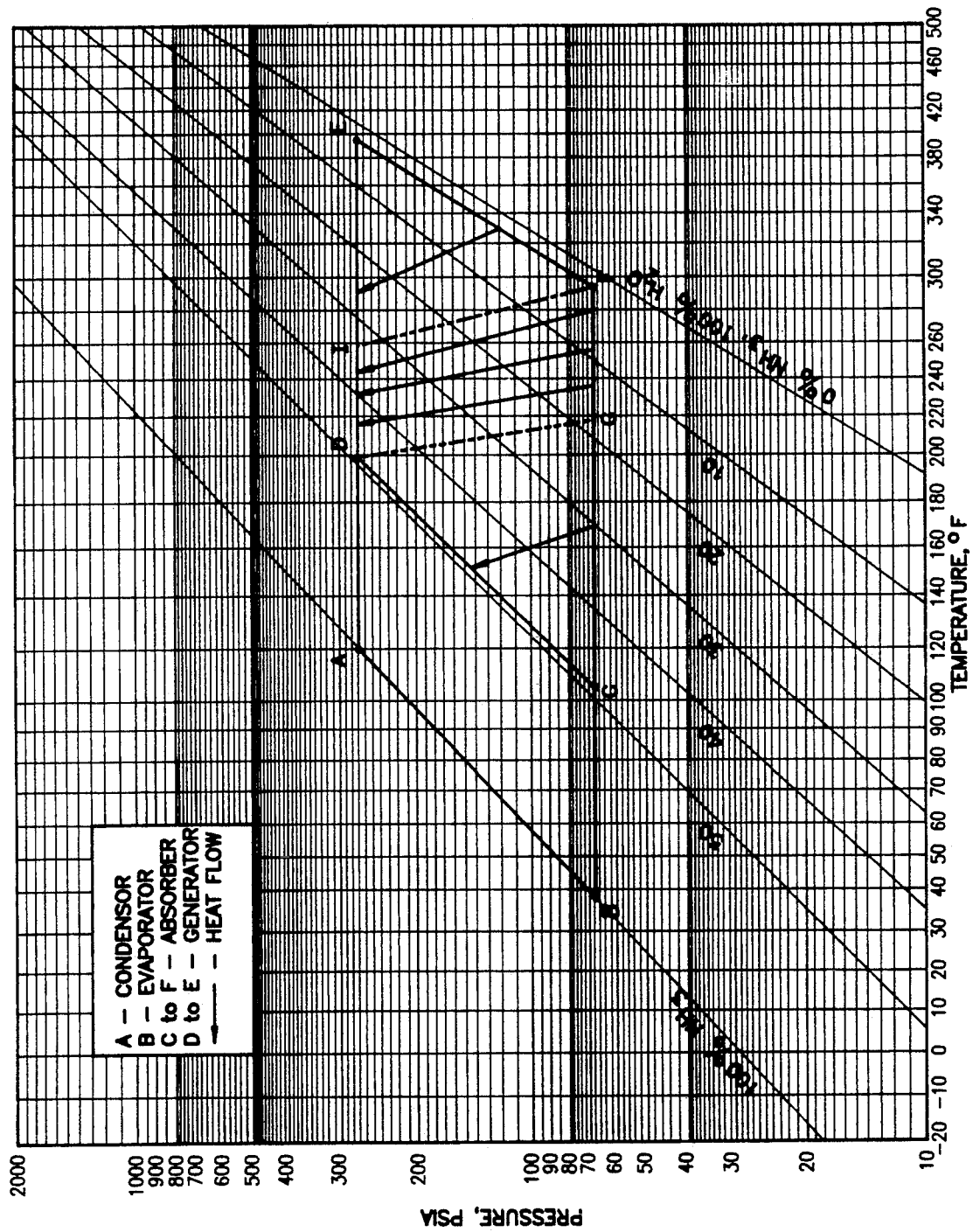
FIG. 2 is a pressure-temperature-composition diagram (P-T-X) of the cycle in FIG. 1.
Figure 3:
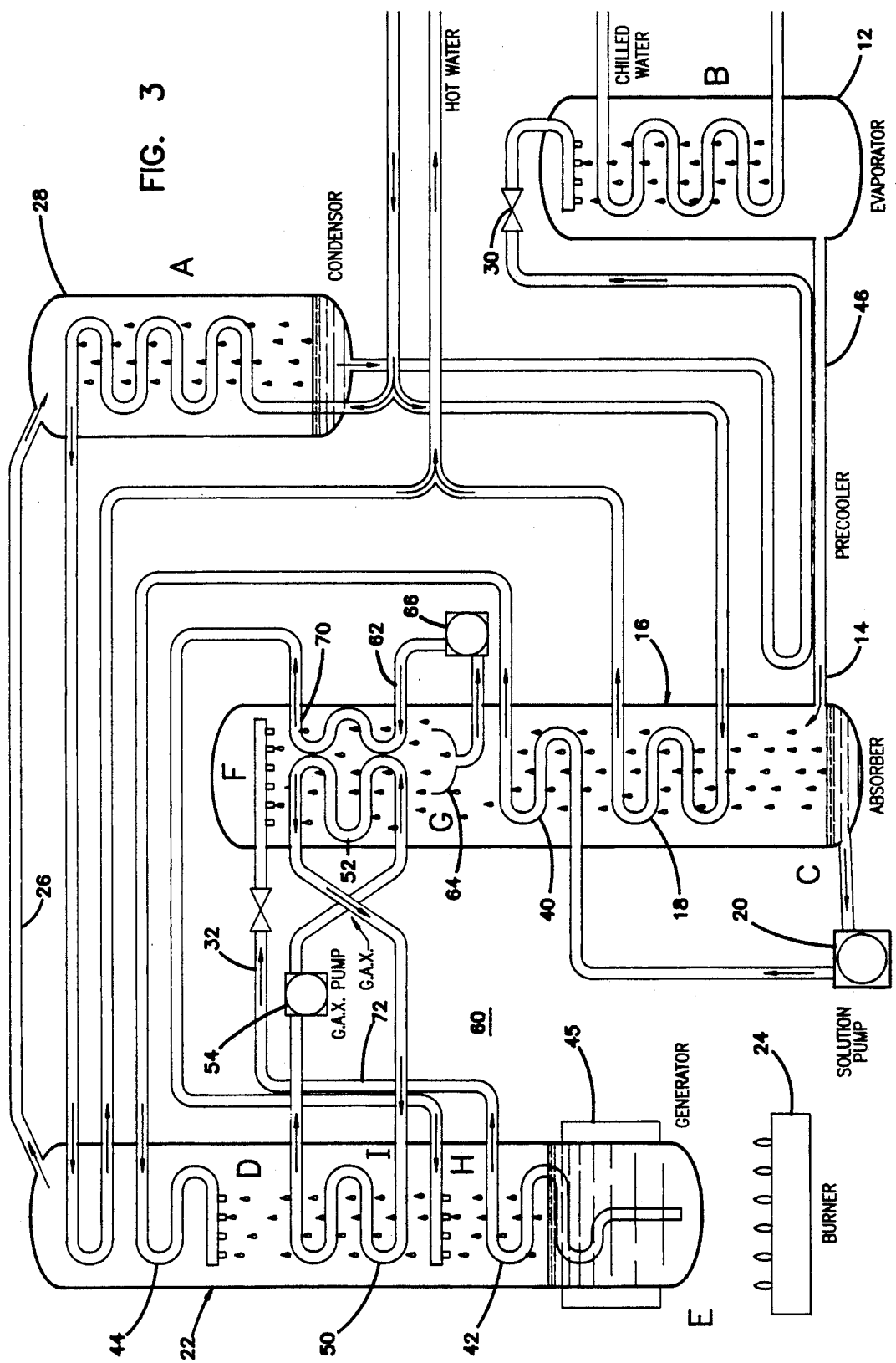
FIG. 3 is a flow diagram illustrating an enhanced GAX cycle according to one aspect of the invention.

Referring now specifically to the drawings, and the illustrative embodiments depicted therein, a heat pump 60, incorporating a high-efficiency enhanced GAX (ENGAX) cycle includes the components of the conventional GAX cycle heat pump 10, illustrated in FIG. 1, and further includes augmenting means for increasing the flow of absorbent in the overlap temperature region of the absorber, (line G-F in FIG. 2) and in the high temperature region of the generator, (line I-E in FIG. 2). This is accomplished by adding flow increasing means, generally illustrated at 62, for transferring additional solution from an intermediate to high temperature portion of absorber 16 to a portion of generator 22 (FIG. 3). In the illustrated embodiment, flow increasing means 62 is a solution pathway from an intermediate temperature portion G of absorber 16 to a high temperature portion H of generator 22, although the pathway may initiate at the bottom of the high temperature portion of the absorber and terminate at a different portion of the generator. This solution exchange pathway includes a collector 64 for collecting intermediate-temperature solution at point G in absorber 16, a second solution pump 66 and a conduit 62 from pump 66 to region H in generator 22. Conduit 62 includes a portion 70 that extends into high temperature region F of absorber 16, in order to heat the solution transferred by flow increasing means 62, and a second portion 72 in heat transfer association with weak solution conduit 32, in order to further increase the temperature of the fluid to point H of the generator, when necessary.

Figure 4:
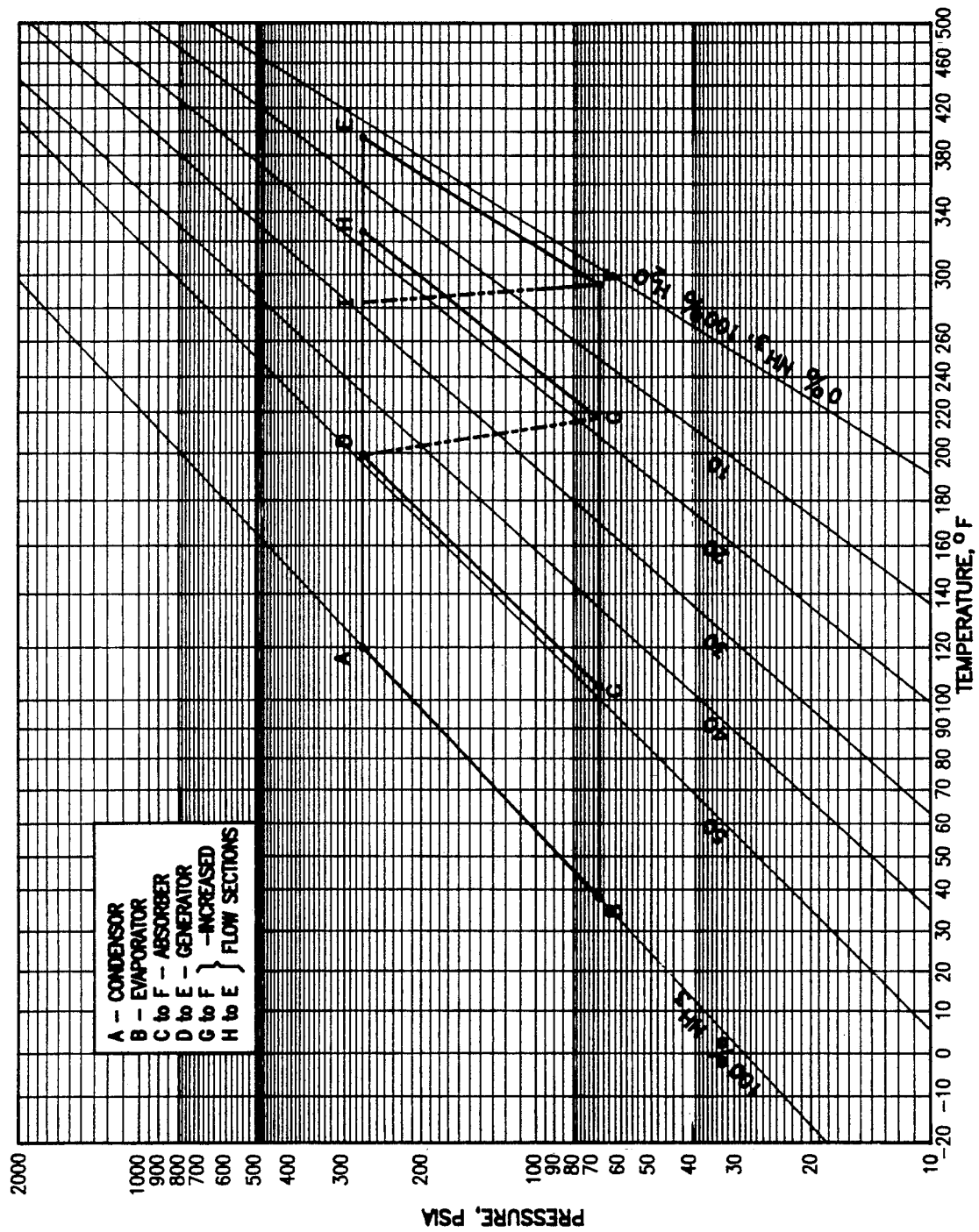
FIG. 4 is a pressure-temperature-composition diagram (P-T-X) of the cycle in FIG. 3.

A comparison of the pressure-temperature-composition diagram of the conventional GAX cycle in FIGS. 1 and 2 and that of augmented GAX cycle, illustrated in FIGS. 3 and 4 reveals that the heat transferred by the absorber in the conventional GAX across its overlap range, illustrated as the line D-I in FIG. 2 is less than the heat that the generator could utilize over the full overlap temperature range shown in FIG. 4. It has been discovered that the main reason for this inequality is that greater quantities of absorption solution flow at the lower temperature portions of the generator and absorber than at the higher temperature portions thereof. This inequality of flow results in higher heat quantities per degree of temperature in the cooler portions of the absorber and generator than in the hotter of the two components.

In the enhanced GAX cycle, the solution recirculation pathway, illustrated in FIG. 4 as the line from points G to H, H to E, E to F and F to G, increases the flow in the high temperature regions of the absorber (line F-G) and of the generator (like H-E) and in the weak liquid pathway (E-F). This increased flow increases the absorption and the absorber heat output in the overlap temperature range so that all of the heat that the generator can utilize over range D-I in FIG. 4 is being provided. The transferred solution is heated from the temperature at point G to the temperature at point H by heat transfer from the higher temperature region 70 of absorber 16 (line G-F in FIG. 4) and heat transfer from the weak solution pathway at 72 (line E-F in FIG. 4) as indicated in FIG. 3.

The flow in the circuit GHEFG must be sufficient to provide the increased heat input to the generator overlap region D-I and to also heat the fluid in circuit 62 (line G to H in FIG. 4) by both absorption heat from the absorber overlap region F-G and by sensible heat transfer at 72 (See FIG. 3 and line E-F, FIG. 4) from the weak liquid circuit. This increase in GAX heat to the generator increases the COP and can be used to reduce the gas heat input, or to increase the refrigerating capacity at the same input, or a combination of the two.

A comparison of the heat balances of the conventional GAX cycle with the enhanced, or augmented, GAX cycle, at the same operating conditions, as shown in tables 1 and 2, indicates an increase in cycle COP in the cooling mode of from 1.027 to 1.191, or approximately 16%. This increase in cooling mode performance is especially significant. It should be noted that the estimated 16% increase in cooling COP is expected to approach 20% as cycle operation is further refined. Complete heat and mass balance calculations for the enhanced GAX cycle (EnGAX) are set forth in Appendix A, which forms a part of this application.

TABLE 1

| OPERATING CONDITIONS All Cycles | | |
|---|---|---|
| | PRESSURE PSIA | TEMP °F. |
| Condenser | 272.6 | 117.0 |
| Evaporator | 68.67 | 37.0 |
| Absorber | 68.67 | 105.0–289.4 |
| Generator | 272.6 | 199.7–398.8 |

TABLE 2

| HEAT OUTPUTS AND INPUTS Per Pound of Refrigerant | | |
|---|---|---|
| | GAX CYCLE (FIGS. 1 and 2) | ENHANCED GAX CYCLE (FIGS. 3 and 4) |
| Rectifier Output | 78.44 Btu | 78.77 Btu |
| Condenser Output | 504.92 Btu | 504.92 Btu |
| Evaporator Input | −503.02 Btu | −503.02 Btu |
| Absorber Net Output | 409.05 Btu | 341.78 Btu |
| Generator Input | −489.73 Btu | −422.45 Btu |
| GAX Heat Transferred | 295.96 | 355.70 |
| Cooling COP | 1.027 | 1.191 |
| Heating COP | 2.027 | 2.191 |

The enhanced, or augmented, GAX cycle in FIG. 3 has been illustrated with collector 64 being positioned at the lower temperature portion of the region of temperature overlap with the generator. However, according to the principles of the invention, it would be possible to position collector 64 at a higher temperature portion of the absorber. When solution is collected from the higher temperature portion of the temperature overlap region, the narrower temperature range from which solution is collected increases the amount of solution which must be circulated through the enhancing circuit, but the heat is at a higher temperature and is therefore more readily transferred to the generator. Thus, depending upon the parameters of the system, there are optimum temperature ranges over which the enhancement liquid can be circulated.

Figure 5:
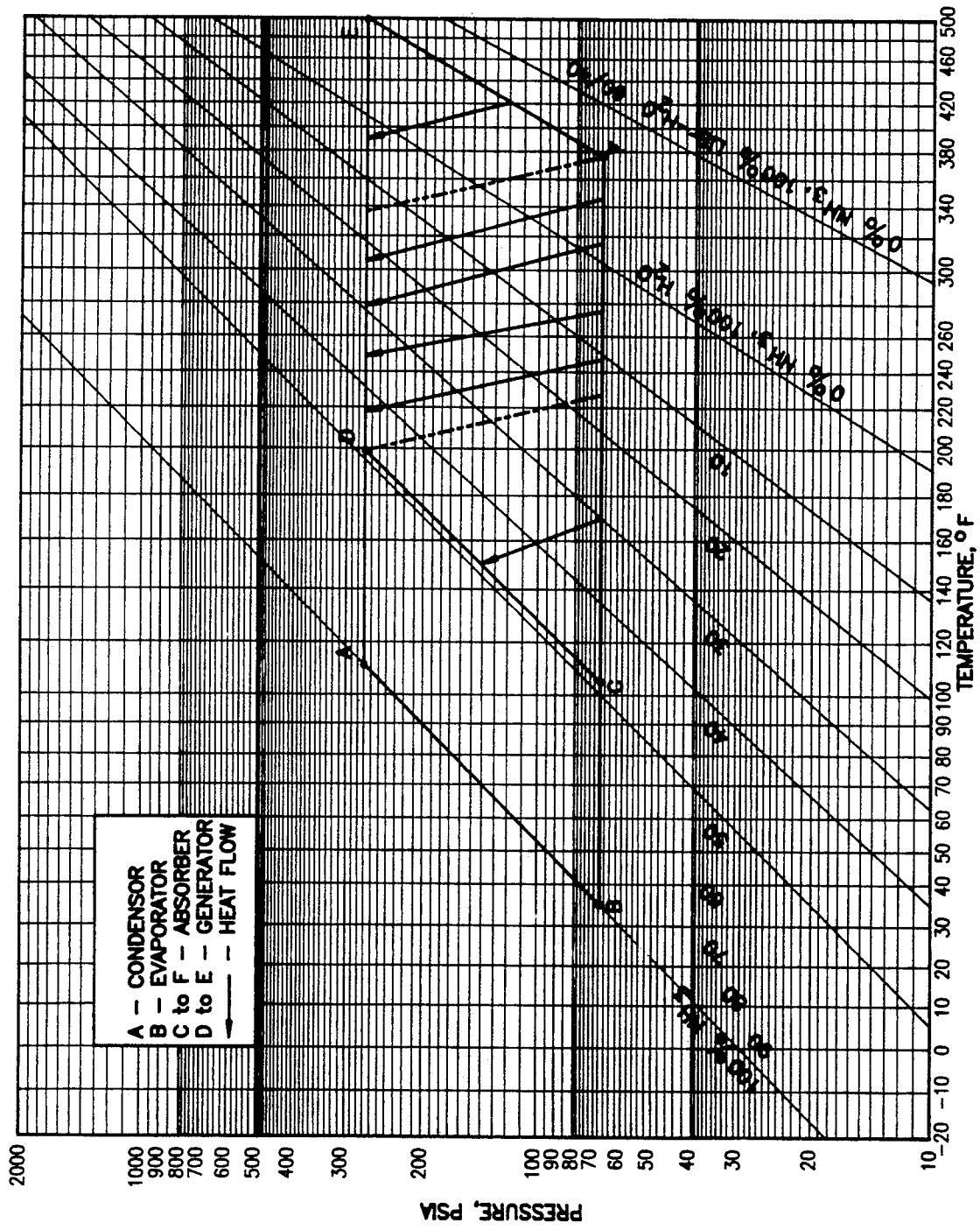
FIG. 5 is a pressure-temperature-composition diagram (P-T-X) of a high-efficiency GAX cycle, using a ternary working fluid.

A method of increasing the overlap temperature range is to use working fluids with a greater temperature difference between the boiling points of the refrigerant and the absorbent. An example is shown in FIG. 5 in which the refrigerant is ammonia and the absorbent is a solution of 60% lithium bromide and 40% water. As can be seen in FIG. 5, the vapor pressure line of the lithium bromide - water absorbent is at a significantly higher temperature than that of water alone. As a result the temperature ranges of the absorber and generator can be made longer than with ammonia/water and the absorber overlap range GF can also be longer.

An additional improvement to the GAX cycle may be obtained by the use of ternary fluids composed of ammonia, water and a dissolved salt. A suitable salt extends the temperature range of the fluid beyond that of ammonia and water to 500° F., or more, as illustrated in FIG. 5. The increase in temperature range of the cycle increases the overlap temperature range between the absorber and generator. One such ternary fluid is ammonia, water and lithium bromide, whose vapor pressure properties were determined by R. Radermacher in a published PhD thesis entitled, "Working Substance Combinations for Absorption Heat Pumps."

It has been discovered that the increased overlap temperature range provided by the use of a ternary working solution has less than expected benefits in a conventional GAX cycle. This is believed to be a result of a redistribution of the ammonia/water concentration gradients toward a low temperature portion of the P-T-X diagram. However, the increased flows of the enhanced GAX (EnGAX) can be used to overcome the effects of the concentration gradients for effective performance. Accordingly, the 16% increase in performance over the conventional GAX cycle may be increased to 40% or more by the use of a ternary working fluid and a higher peak generator temperature, in the range of 500° F. with an enhanced GAX cycle. The enhanced GAX cycle therefore, provides additional unexpected results with respect to the conventional GAX cycle when combined with a ternary working fluid.

The ternary fluid combination of water/ammonia/lithium bromide, has a disadvantage of being very corrosive at operating temperatures, even when used with stainless steels. Other ammonia/water/salt combinations and other fluids with wide temperature overlap potential are being investigated. Salts that are believed to have potential include lithium nitrate and calcium nitrate.

Figure 6:
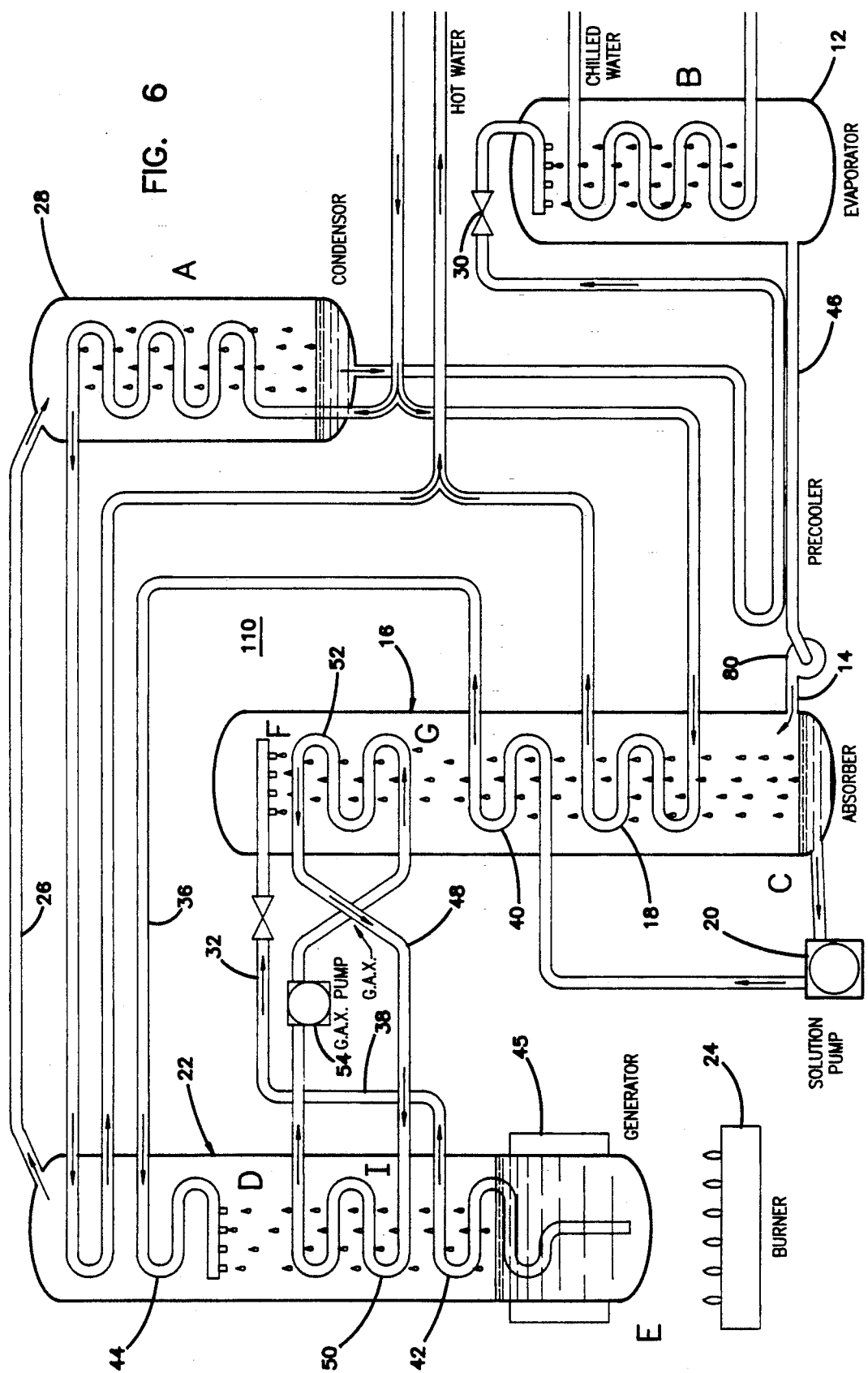
FIG. 6 is a flow diagram illustrating an enhanced generator-absorber heat-exchange (GAX) cycle according to another aspect of the present invention.
Figure 7:
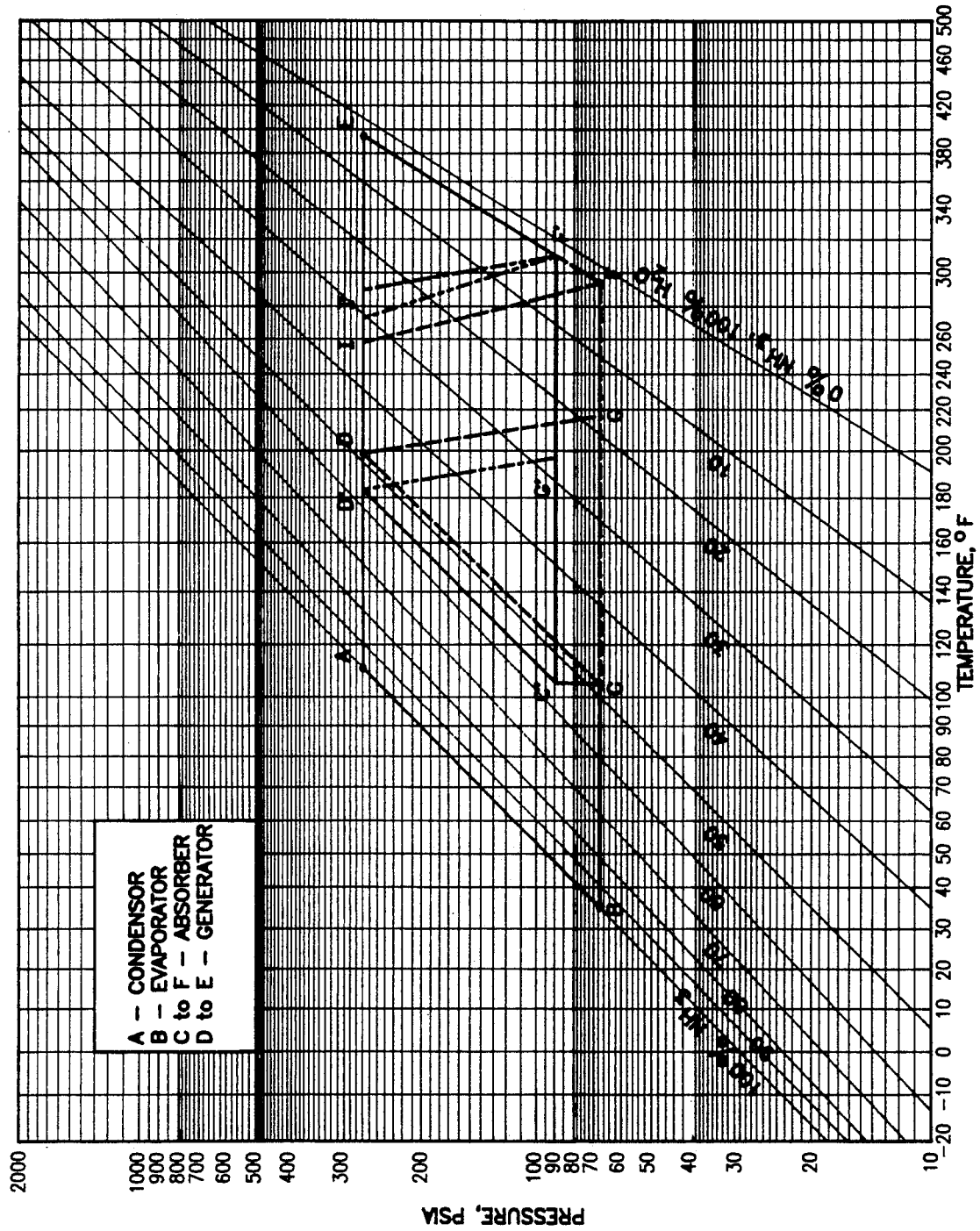
FIG. 7 is a pressure-temperature-composition diagram (P-T-X) of the cycle in FIG. 6.

It has been determined that a significant improvement in system COP's may be obtained in GAX or enhanced GAX systems described herein by increasing the operating pressure within absorber 16. By increasing the absorber pressure, the extent of overlap between the operating temperatures of absorber 16 and generator 22 is increased. Thus, a greater proportion of the total generator heat requirement can be supplied by absorption heat, thereby increasing system COP's. FIG. 6 illustrates a GAX cycle 110 which is the basic GAX cycle 10 of FIG. 1 modified by the addition of vapor compressor 80 in conduit 14 between absorber 16 and evaporator 12. A cycle diagram of the GAX cycle 110 in FIG. 6 is shown in FIG. 7. In FIG. 7 the solid lines represent the increased-pressure absorber cycle and the dotted lines the basic GAX cycle of FIG. 2.

FIG. 7 illustrates the effects of increasing the operating pressure of absorber 16. In the basic GAX, without increasing the operating pressure of absorber 16 by use of compressor 80, the overlap between the temperature ranges of the absorber and the generator is represented by the dotted lines G-F and D-I. After increasing the operating pressure of absorber 16 by approximately 20 psia, the operating line for the absorber is modified from C-G-F to C'-G'-F'. As a result, the line of constant composition C-D is relocated to C'-D'. Thus, the point of intersection between lines G-D and A-E is changed from D to D'. This results in the low temperature end of the overlap between operating temperature ranges of absorber 16 and generator 22 being extended.

In terms of the physical process, the strong solution increases in concentration, reducing the temperature at the solution feed point to generator 22, FIG. 6 (point D' in FIG. 7) as well as the temperature of the heat transfer liquid exiting the generator to GAX pump 54. Besides broadening the GAX overlap region, this enrichment of the strong solution also reduces the rectifier losses occurring along line D-A of FIG. 7. An increase in operating pressure of absorber 16 also results in a shift of the point of intersection between lines F-I and A-E, from I to I'. Thus, the high temperature end of the overlap between operating temperature ranges of absorber 16 and generator 22 is also extended. In terms of the physical process, the concentration of the weak solution is not changed, but the heat transfer fluid flowing from the absorber to the generator in line 48 of FIG. 6 is increased in temperature, thus perhaps requiring relocating the entry of line 48 into the generator at a lower (and higher temperature) spot. The result is that provision of means for increasing pressure in the absorber from C to C' results in an increase in the overlap temperature range of the absorber and generator at both the high end and low end of the overlap range. This increase appears to exceed, to a significant degree, the mechanical energy required to raise the absorber pressure.

The amount of pressure increase is to be limited in view of the additional power required for compressing the vapor, so that the savings from reduced heat requirements for generator 22 (from burner 24) will be greater than the extra costs incurred in operating compressor 80. More specifically, the extent of pressure increase in absorber 16 should be adjusted to maximize the difference between the reduction in energy requirements of generator 22 and the power requirement of compressor 80.

Figure 8:
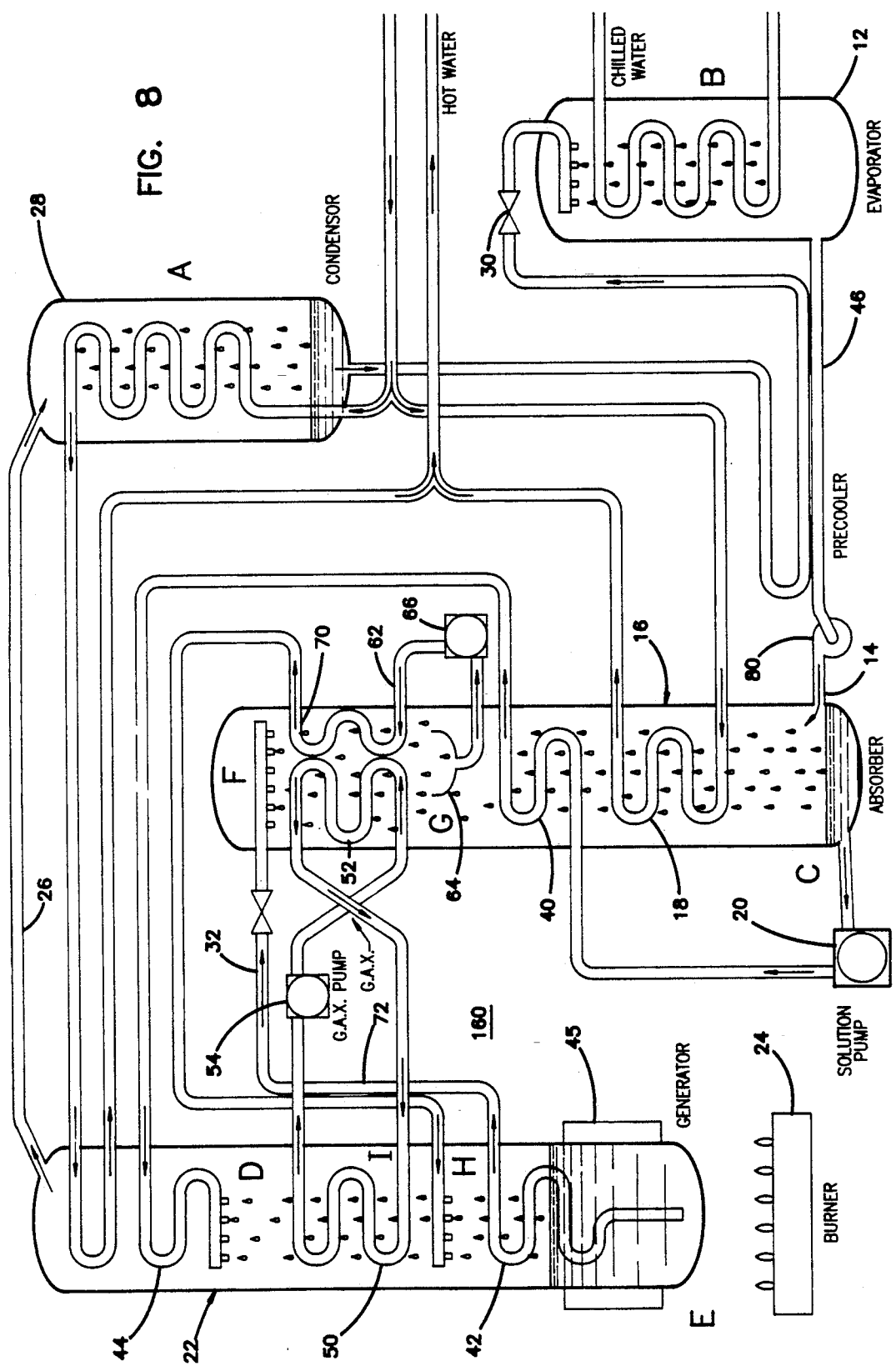
FIG. 8 is a flow diagram illustrating a hybrid enhanced GAX cycle using both aspects of the invention.
Figure 9:
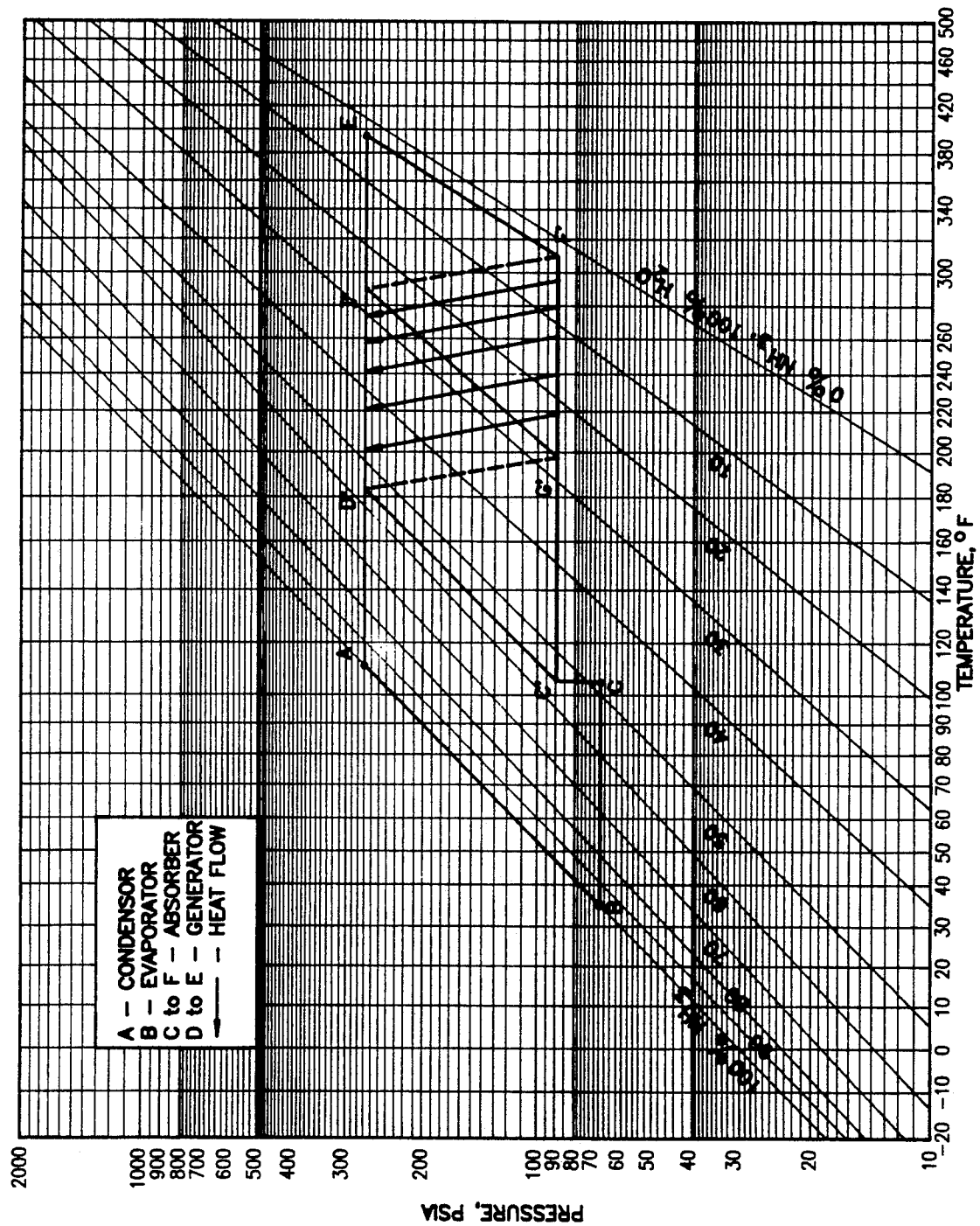
FIG. 9 is a pressure-temperature-composition diagram (P-T-X) of the cycle in FIG. 8.
Figure 10:
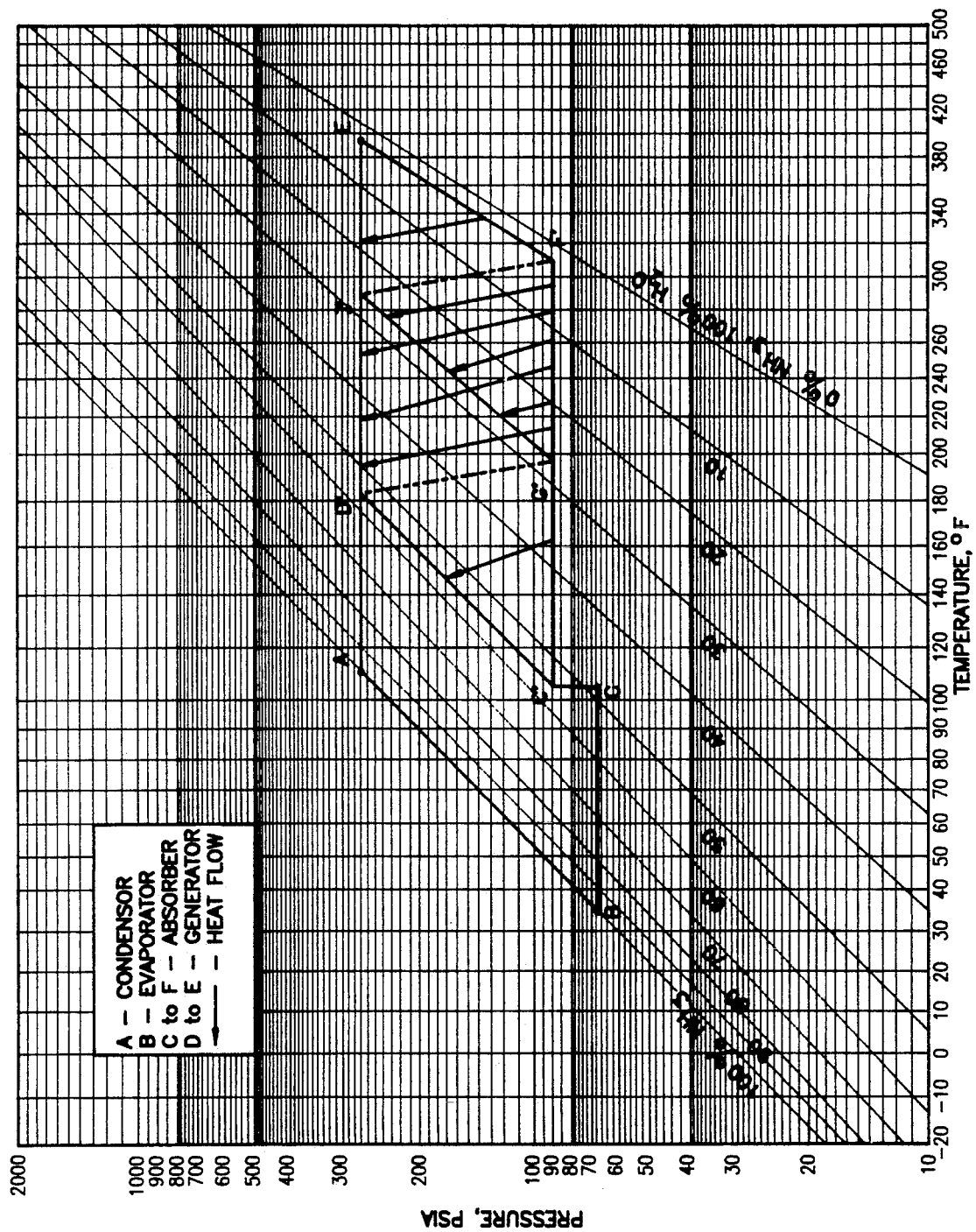
FIG. 10 is a pressure-temperature-composition diagram (P-T-X) of the cycle of FIG. 8 showing the heating of the recirculating stream by the overlap absorption heat.

Alternatively, the enhanced GAX cycle may be modified according to the present invention, as shown in FIG. 8, in which vapor compressor 80 is likewise located in conduit 14 between absorber 16 and evaporator 12. Because conduit 14 discharges to absorber 16, the insertion of compressor 80 serially in conduit 14 increases the operating pressure within absorber 16 to a level higher than that in FIGS. 1 and 3. FIGS. 8 and 9 illustrate GAX cycle 160, the combination of the pressurized absorber aspect of this invention with the increased flow of absorbent through the overlap portion of the absorber and the absorbent. Tables 3 and 4 indicate the performance gains possible by this combination. The cycle diagram in FIG. 10 shows that the heat output from the absorber overlap area is to be sufficient to supply the needs of the generator and to heat the recirculated liquid in circuit 62 of FIG. 4.

TABLE 3

| HEAT OUTPUTS AND INPUTS Per Pound of Refrigerant | | |
|---|---|---|
| | GAX CYCLE (FIGS. 1 AND 2) | COMPRESSION GAX CYCLE (FIGS. 6 AND 7) |
| Rectifier Output | 78.44 Btu | 45.93 Btu |
| Condenser Output | 504.92 Btu | 504.92 Btu |
| Evaporator Input | −503.02 Btu | −503.02 Btu |
| Absorber Net Output | 409.05 Btu | 372.39 Btu |
| Generator Input | −489.73 Btu | −420.22 Btu |
| GAX Heat Transferred | 295.96 | 407.74 |
| Cooling COP | 1.027 | 1.197 |
| Heating COP | 2.027 | 2.197 |

TABLE 4

|  | GAX CYCLE (FIGS. 1 AND 2) | ENHANCED + COMPRESSION GAX CYCLE (FIGS. 8, 9 AND 10) |
|---|---|---|
| Rectifier Output | 78.44 Btu | 66.19 Btu |
| Condenser Output | 504.92 Btu | 504.92 Btu |
| Evaporator Input | −503.02 Btu | −503.02 Btu |
| Absorber Net Output | 409.05 Btu | 297.73 Btu |
| Generator Input | −489.73 Btu | −365.82 Btu |
| GAX Heat Transferred | 295.96 | 519.26 |
| Cooling COP | 1.027 | 1.375 |
| Heating COP | 2.027 | 2.375 |

Figure 11:
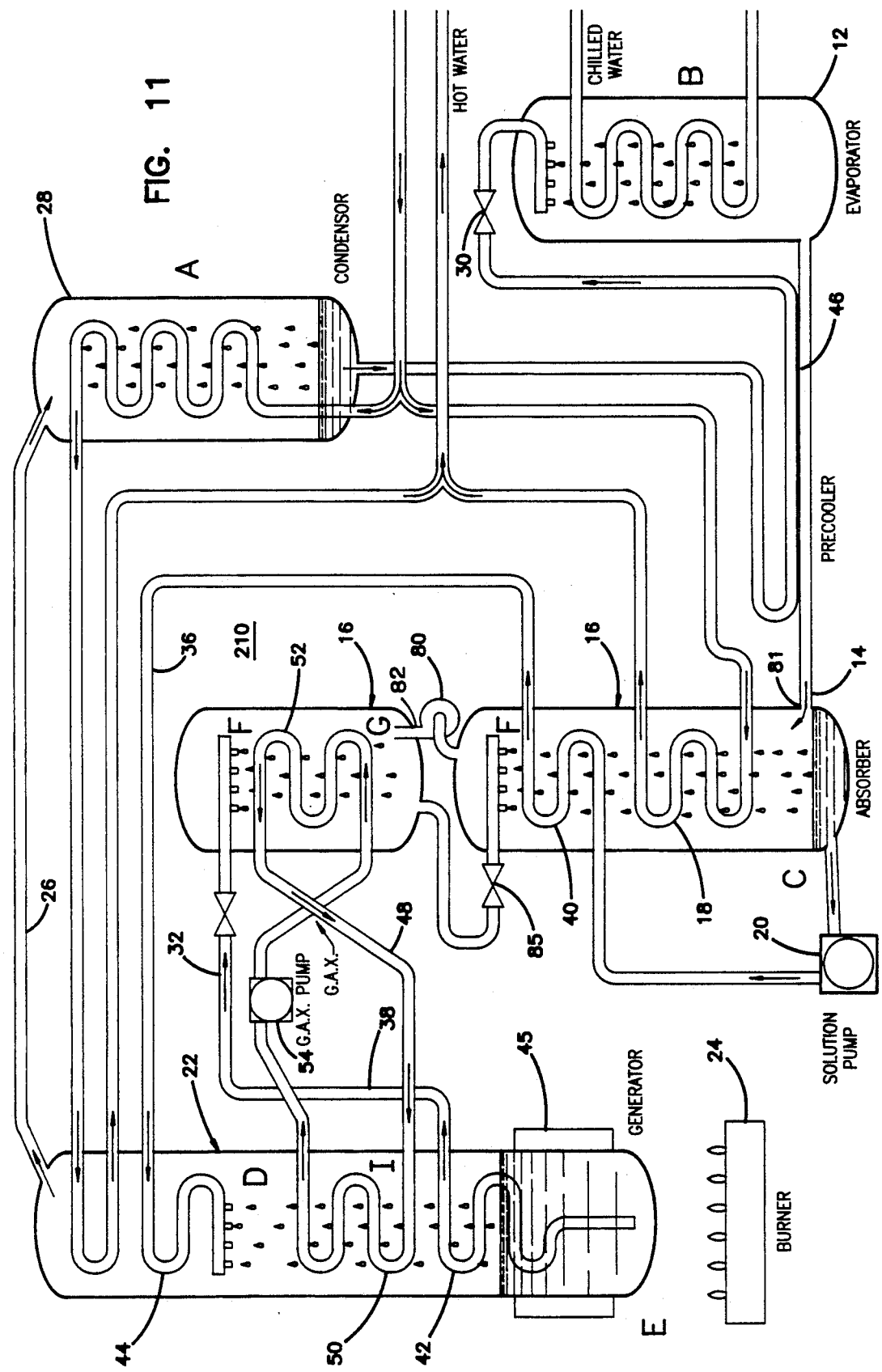
FIG. 11 is a flow diagram illustrating a variation of the enhanced GAX cycle according to another aspect of the invention.

In another embodiment of this technique of improving the system COP in GAX cycles, it has been found that increases in absorber operating pressures may be limited to specific portions of absorber 16. An example is to compress only the vapor flowing to the absorber GAX section. FIG. 11 illustrates GAX cycle 210, increasing the operating pressure in only the temperature overlap (GAX) portion of absorber 16. In this application vapor compressor 80 has been moved from the vapor inlet 81 of absorber 16 to the vapor inlet 82 of the GAX section of absorber 16. The cooler portion of absorber 16 remains at evaporator pressure, with only the GAX, overlap, portion being at a higher pressure. The absorbent liquid flowing from the higher pressure GAX section to the lower pressure AHE section is throttled by a suitable restriction 85, to allow only liquid to flow from one absorber portion to another. Restriction 85 may be in the form of a float valve, or other means known to those skilled in the art.

Figure 12:
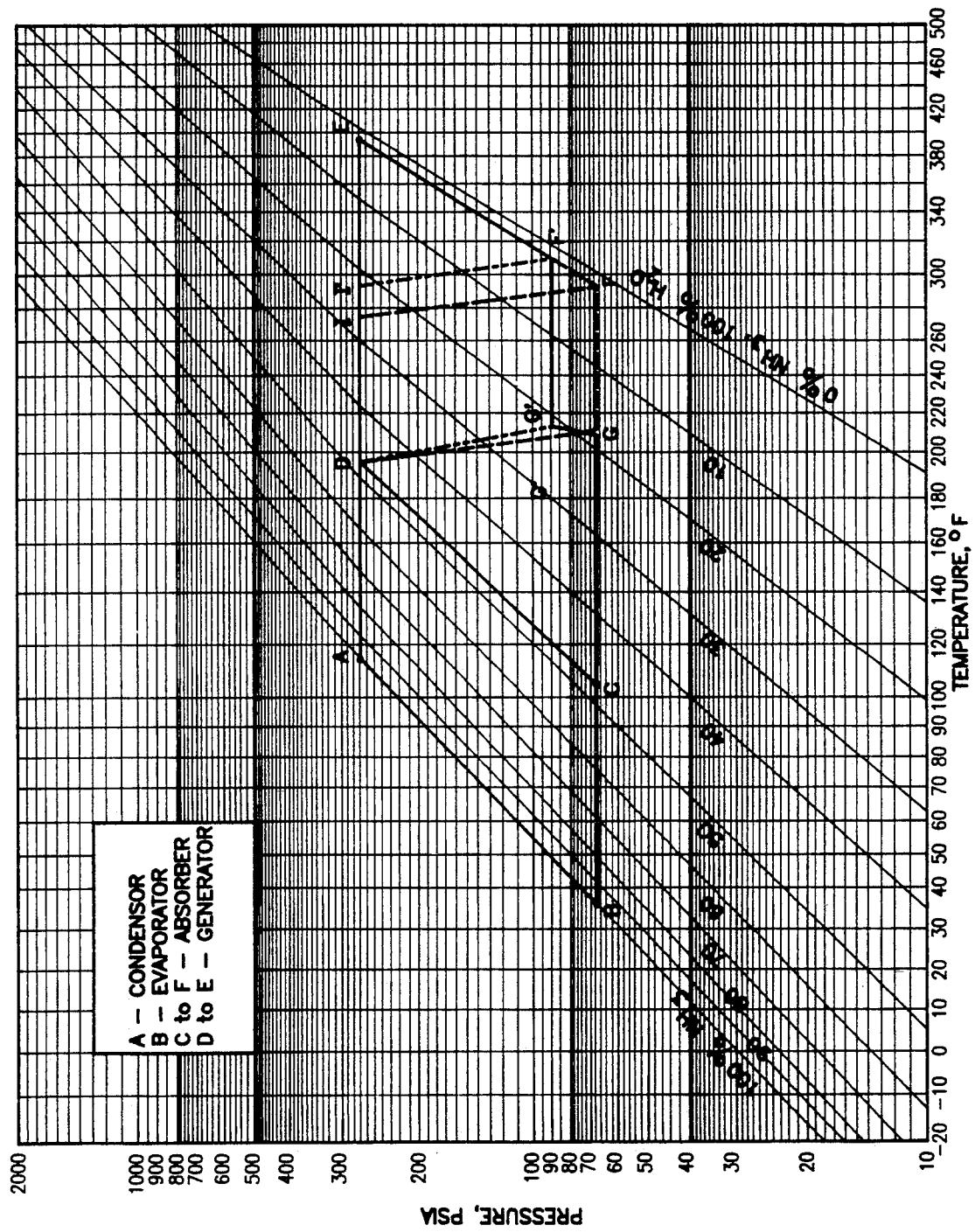
FIG. 12 is a pressure-temperature-composition diagram (P-T-X) of the cycle of FIG. 11.

In the cycle diagram of FIG. 12 the operation for this concept is shown in solid lines, while that of the normal GAX is in dotted. Before increasing absorber pressure 16, the overlap temperature range between the temperature ranges of absorber 16 and generator 22 is represented by lines D-I and G-F. After increasing the operating pressure in only a portion of absorber 16, the operating line for that particular portion is modified from G-F to G'-F'. This results in the higher end of the generator overlap being extended from D-I to D-I'. Thus, reduced operating expenses are realized as only a portion of the refrigerant vapor entering absorber 16 needs to be increased in pressure, rather than all of the refrigerant entering the absorber. In the illustrated embodiment it has been estimated that generally less than 25% of the total refrigerant to be absorbed need be compressed.

The absorber vapor can be compressed to the higher pressure at any point between B and F, with varying advantages in the pumping power required, in equipment cost and in GAX enhancement. The best temperature at which to pump the gas is also likely to depend on the relative costs of natural gas and electricity. The invention is therefore intended to be useable for compression of the vapor at any temperature, from point B to point F, that is best suited to the application.

While the enhanced GAX cycle has been illustrated in a residential or light commercial heat pump, its benefits are not limited to such applications. The enhanced performance provided by the EnGAX cycle set forth herein, may be applied to industrial absorption systems for applications to processes requiring medium temperature heating and cooling such as brewing, food processing, pasturizing and paper making, to mention but a few examples. Furthermore, the principles of the invention are not limited to absorption heat pump cycles that efficiently convert heat from a combination of low and high temperatures heat sources to heat at a medium temperature. The invention is equally applicable to heat transformers which convert heat from a medium-high temperature, such as heated waste water discharged from a processing plant, to a useful high temperature output plus a low temperature output.

Changes and modifications in the specifically described embodiments can be carried out without departing from the principles of the invention. Accordingly, while the means for increasing the flow of solution from the temperature overlap region of the absorber to the generator is provided in the illustrative embodiments by a solution pump and a conduit in heat transfer association with higher temperature portions of the system, other techniques may be utilized to transfer the fluid while raising its temperature. For example, pressurized transfer vessels incorporating appropriate check valves and control valves, and other fluid propelling techniques, as are known to those skilled in the art, may be utilized. Other changes and modifications will suggest themselves to those skilled in the art. The protection afforded the invention is intended to be limited only by the scope of the appended claims, as interpreted according to the principles of patent law, including the Doctrine of Equivalents.

APPENDIX A

Heat and Mass Balance Calculation EnGAX Cycle

| DATA | P | T | X | Y | Hx | Hy | M |
|---|---|---|---|---|---|---|---|
| COND W | 272.60 | 117 | .995 | .999947 | 96.426 | 558.03777 | 1 |
| EVAP W | 68.667 | 37 | .995 | .999995 | 3.9331 | 546.33132 | 1 |
| GEN PEAK | 272.60 | 398.8 | .02 | .109387 | 370.64 | 1151.5539 | 1.5755 |
| ABS OUT | 68.667 | 105 | .477465 | .993235 | −26.89 | 589.76183 | 1.9121 |
| FEED W | 272.60 | 199.7 | .477465 | .974549 | 78.866 | 629.35701 | 1.9121 |
| COND IN | 272.60 | 151.7 | .667030 | .995 | 43.677 | 586.90823 | 1 |
| V TO RCT | 272.60 | 207 | .454553 | .968844 | 87.180 | 636.79318 | 1.0521 |
| L FR RCT | 272.60 | 203 | .466941 | .972067 | 82.582 | 632.69173 | .05211 |
| COND OUT | 227.72 | 105 | .995 | .999962 | 81.984 | 557.58175 | 1 |
| PCVL OUT | 68.667 | 98.17 | .502676 | .995 | −34.05 | 585.00282 | 1 |
| ABS WL I | 68.667 | 289.4 | .02 | .172467 | 254.66 | 1093.5071 | 1.5755 |
| ABS ILGX | 68.667 | 210 | .178611 | .817280 | 129.24 | 734.76669 | 1.2740 |
| ABS IVGX | 68.667 | 200 | .202760 | .855527 | 112.63 | 710.45895 | .36184 |
| EGL ABS | 68.667 | 210 | .178611 | .817280 | 129.24 | 734.76669 | .66332 |
| ENG T HG | 186.29 | 283 | .178611 | .745258 | 207.94 | 797.15268 | .66332 |
| GEN IL W | 272.60 | 280 | .259710 | .843155 | 188.55 | 740.89614 | 1.4900 |
| GEN IV W | 272.60 | 290 | .235659 | .811610 | 204.06 | 761.62881 | .57784 |
| | P | T | X, Y | | Hx, Hy | Lbs | Btu |

HEAT AND MASS BALANCE

APPENDIX A-continued

RCTIFIER
| | | | | | | |
|---|---|---|---|---|---|---|
| Vap In | 272.60 | 207 | .968844 | 636.793 | 1.0521 | 669.98 |
| RfL OUT | 272.60 | 203 | .466941 | 82.5820 | .05211 | 4.30 |
| RfV Out | 272.60 | 151.7 | .995 | 586.908 | 1 | 586.91 |
| | | RECTIFIER HEAT OUT | | | | 78.77 |

CONDENSER
| | | | | | | |
|---|---|---|---|---|---|---|
| RfV In | 272.60 | 151.7 | .995 | 586.908 | 1 | 586.91 |
| RfL Out | 227.72 | 105 | .995 | 81.9839 | 1 | 81.98 |
| | | CONDENSER HEAT OUT | | | | 504.92 |

EVAPORATOR-PRECOOLER
| | | | | | | |
|---|---|---|---|---|---|---|
| RfL In | 227.72 | 105 | .995 | 81.9839 | 1 | 81.98 |
| RfV Out | 68.667 | 98.17 | .995 | 585.003 | 1 | 585.00 |
| Liq Out | 68.667 | 98.17 | .502676 | −34.045 | 0 | .00 |
| | | EVAPORATOR HEAT IN | | | | −503.02 |
| | | MAX PRECOOLER HEAT | | | | −283.46 |

ABSORBER
| | | | | | | |
|---|---|---|---|---|---|---|
| WL In | 68.667 | 289.4 | .02 | 254.662 | 1.5755 | 401.21 |
| Vap In | | | | | 1 | 585.00 |
| Liq In | | | | | 0 | .00 |
| RL Out | 272.60 | 199.7 | .477465 | 78.8659 | 1.9121 | 150.80 |
| EGL OUT | 186.29 | 283 | .178611 | 207.940 | .66332 | 137.93 |
| | | HEAT OF ABSORPTION | | | | 697.48 |

LOW TEMP ABSORBER
| | | | | | | |
|---|---|---|---|---|---|---|
| IL IN | 68.667 | 210 | .178611 | 129.244 | 1.2740 | 164.65 |
| Vap In | | | | | | 585.00 |
| LIQ IN | | | | | | 0 |
| RL OUT | 272.60 | 199.7 | .477465 | 78.8659 | 1.9121 | 150.80 |
| IV OUT | 68.667 | 200 | .855527 | 710.459 | .36184 | 257.08 |
| | | HEAT OUT | | | | 341.78 |

HIGH TEMP ABSORBER
| | | | | | | |
|---|---|---|---|---|---|---|
| IV IN | 68.667 | 200 | .855527 | 710.459 | .36184 | 257.07521 |
| WL IN | 68.667 | 289.4 | .02 | 254.662 | 1.5755 | 401.20969 |
| IL OUT | 68.667 | 210 | .178611 | 129.244 | 1.2740 | 164.65482 |
| EGL OUT | 186.29 | 283 | .178611 | 207.940 | .66332 | 137.93058 |
| | | GAX HEAT | | | | 355.69949 |

GENERATOR
| | | | | | | |
|---|---|---|---|---|---|---|
| RL IN | 272.60 | 199.7 | .477465 | 78.8659 | 1.9121 | 150.80264 |
| EGL IN | 186.29 | 283 | .178611 | 207.940 | .66332 | 137.93058 |
| V TO RCT | 272.60 | 207 | .968844 | 636.793 | 1.0521 | 669.97840 |
| L FR RCT | 272.60 | 203 | .466941 | 82.5820 | .05211 | 4.3035998 |
| WL OUT | 68.667 | 289.4 | .02 | 254.662 | 1.5755 | 401.20969 |
| | | | | | | −778.1513 |

LO TEMP GENERATOR
| | | | | | | |
|---|---|---|---|---|---|---|
| RL IN | 272.60 | 199.7 | .477465 | 78.8659 | 1.9121 | 150.80264 |
| V TO RCT | 272.60 | 207 | .968844 | 636.793 | 1.0521 | 669.97840 |
| L FR RCT | 272.60 | 203 | .466941 | 82.5820 | .05211 | 4.3035998 |
| GIL OUT | 272.60 | 280 | .259710 | 188.546 | 1.4900 | 280.93086 |
| GIV IN | 272.60 | 290 | .811610 | 761.629 | .57784 | 440.10317 |
| | | GAX HEAT | | | | −355.6999 |

HI TEMP GENERATOR
| | | | | | | |
|---|---|---|---|---|---|---|
| GIL IN | 272.60 | 280 | .259710 | 188.546 | 1.4900 | 280.93086 |
| GIV OUT | 272.60 | 290 | .811610 | 761.629 | .57784 | 440.10317 |
| EGL IN | 186.29 | 283 | .178611 | 207.940 | .66332 | 137.93058 |
| WL OUT | 68.667 | 289.4 | .02 | 254.662 | 1.5755 | 401.20969 |
| | | HEAT IN | | | | −422.4514 |

| TOTAL HEAT IN | −925.47 | TOT HEAT OUT | 925.47073 |
|---|---|---|---|
| COOLING COP | 1.19071 | HEATING COP | 2.1907152 |

The embodiments of the invention in which an exclusive property of privilege is claimed are defined as follows:

1. An absorption heat pump apparatus comprising:
   a generator, a condenser, an evaporator and an absorber;
   a strong solution pathway including a solution pump for transferring solution from a low temperature portion of said absorber to said generator;
   a weak solution pathway from said generator to a high temperature portion of said absorber;
   a refrigerant pathway from said generator to said condenser, from said condenser to said evaporator and from said evaporator to said absorber;
   a heat transfer pathway between overlapping temperature regions of said absorber and said generator; and
   a means for increasing the operating pressure of at least a portion of said absorber such that the amount of overlap between the temperature ranges of said absorber and said generator is increased.

2. The absorption heat pump apparatus in claim 1 further comprising:
   a flow means for increasing solution flow in at least a portion of said overlapping temperature region of said absorber and in a portion of said generator.

3. The absorption heat pump apparatus in claim 2 wherein said portion of said generator is a high temperature portion.

4. The absorption heat pump apparatus in claim 2 wherein said flow means includes an intermediate solution pathway from said portion of said overlapping temperature region of said absorber to said generator.

5. The absorption heat pump apparatus in claim 4 further including means for adding heat to solution flowing in said intermediate solution pathway.

6. The absorption heat pump apparatus in claim 5 wherein said means for adding heat adds heat from said high temperature portion of said absorber.

7. The absorption heat pump apparatus in claim 6 wherein said means for adding heat further adds heat from said weak solution pathway.

8. The absorption heat pump apparatus in claim 5 wherein said means for adding heat adds heat from said weak solution pathway.

9. The absorption heat pump apparatus in claim 1 wherein said means for increasing said operating pressure of said absorber is defined by increasing the pressure of the refrigerant entering said absorber from said evaporator.

10. The absorption heat pump apparatus in claim 9 wherein said means for increasing said operating pressure of said absorber includes a compressor located in said refrigerant pathway, between said absorber and said evaporator.

11. The absorption heat pump apparatus in claim 1 wherein said means for increasing said operating pressure of said absorber is performed in only a portion of said absorber.

12. The absorption heat pump apparatus in claim 11 wherein approximately 25% of the total refrigerant entering said absorber is increased in pressure and directed to said absorber portion having said increased operating pressure.

13. The absorption heat pump apparatus in claim 11 wherein said portion of said absorber having said elevated operating pressure is the absorber portion containing said overlapping temperature region.

14. The absorption heat pump apparatus in claim 1 wherein the amount of said operating pressure increase is within a range that will provide a reduction in energy requirements for heating said generator that is greater than the energy requirements for operating said compressor.

15. An absorption heat pump apparatus comprising:
a generator having a first portion and means for applying heat to said first portion in order to separate a refrigerant vapor from a strong solution of said refrigerant and an absorbent, leaving a weak solution of said refrigerant and absorbent, said generator further having a second portion for purifying said refrigerant vapor;
an absorber to which refrigerant is supplied for absorption by a weak solution of said refrigerant and said absorbent to form a strong solution of said refrigerant and said absorbent and liberating heat thereby;
weak solution transfer means for transferring solution from said first portion of said generator to said absorber;
strong solution transfer means for transferring solution from said absorber to said generator;
refrigerant transfer means for transferring refrigerant vapor from said second portion of said generator to a condenser, from said condenser to an evaporator and from said evaporator to said absorber;
a GAX heat exchanger for transferring heat from said absorber to said generator in a temperature range common to said absorber and generator; and
solution transfer means for transferring solution from said absorber in said temperature range to a portion of said generator.

16. The absorption heat pump apparatus in claim 15 wherein said portion of said generator is a high temperature portion.

17. The absorption heat pump in claim 15 further including means for heating solution being transferred by said solution transfer means.

18. The absorption heat pump apparatus in claim 17 wherein said means for heating includes means for transferring heat to said solution transfer means from a high temperature portion of said absorber.

19. The absorption heat pump apparatus in claim 18 wherein said means for heating also includes means for transferring heat to said solution transfer means from said weak solution transfer means.

20. The absorption heat pump apparatus in claim 15 wherein said solution transfer means includes a solution pump for pumping solution and a conduit from said solution pump to said generator.

21. The absorption heat pump apparatus in claim 20 wherein said conduit extends into a high temperature portion of said absorber.

22. The absorption heat pump apparatus in claim 20 wherein said conduit is in heat transfer association with said weak solution transfer means.

23. The absorption heat pump apparatus in claim 20 wherein said conduit terminates at a high temperature portion of said generator.

24. The absorption heat pump apparatus in claim 15 further comprising:
a means for increasing the operating pressure of said absorber such that said temperature range common to said absorber and said generator is increased.

25. The absorption heat pump apparatus in claim 24 wherein said means for increasing said operating pressure of said absorber is defined by increasing the pressure of said refrigerant vapor entering said absorber from said evaporator.

26. The absorption heat pump apparatus in claim 25 wherein said means for increasing said operating pressure for said absorber is further defined by a compressor located in said refrigerant transfer means, between said absorber and said evaporator.

27. The absorption heat pump apparatus in claim 26 wherein the amount of said operating pressure increase is such that the reduction in energy requirements for heating said generator is greater than energy requirements for operating said compressor.

28. The absorption heat pump apparatus in claim 24 wherein said means for increasing said operating pressure of said absorber is performed in only a portion of said absorber.

29. The absorption heat pump apparatus in claim 28 wherein approximately 25% of the total refrigerant vapor entering said absorber is increased in pressure and directed to said absorber portion having said increased operating pressure.

30. The absorption heat pump apparatus in claim 28 wherein said portion of said absorber having said elevated operating pressure is the absorber portion containing said common temperature range.

31. An absorption heat pump apparatus comprising:

a generator, a condenser, an evaporator and an absorber;

a strong solution pathway from a low temperature portion of said absorber to said generator;

a weak solution pathway from said generator to a high temperature portion of said absorber;

a refrigerant pathway from said generator to said condenser, from said condenser to said evaporator and from said evaporator to said absorber;

a GAX heat exchanger for transferring heat from said absorber to said generator in a temperature range common to said generator and absorber; and means for heating fluid in said generator to a peak temperature of approximately 500 degrees Fahrenheit.

32. The absorption heat pump in claim 31 wherein said solution includes ammonia absorbed in water.

33. The absorption heat pump in claim 32 wherein said solution includes a salt additive dissolved in said water.

34. The absorption heat pump in claim 31 further including a solution exchanger for transferring solution from a portion of said absorber in said common temperature range to a portion of said generator.

35. The absorption heat pump in claim 34 including means to transfer heat to said solution exchanger from said high temperature portion of said absorber.

36. The absorption heat pump in claim 31 further comprising:

a means for increasing the operating pressure of said absorber such that the extent of overlap between the temperature range of said absorber and the temperature range of said generator is increased.

37. The absorption heat pump in claim 36 wherein said means for increasing said operating pressure of said absorber is defined by increasing the pressure of the refrigerant entering said absorber from said evaporator.

38. The absorption heat pump in claim 37 wherein said means for increasing the operating pressure of said absorber is further defined by a compressor located in said refrigerant pathway, between said evaporator and said absorber.

39. The absorption heat pump in claim 36 wherein said means for increasing said operating pressure of said absorber is performed in only a portion of said absorber.

40. The absorption heat pump in claim 39 wherein approximately 25% of the total refrigerant entering said absorber is increased in pressure and directed to said absorber portion having said increased operating pressure.

41. The absorption heat pump in claim 39 wherein said portion of said absorber having said elevated operating pressure is the absorber portion containing said common temperature range.

42. The absorption heat pump in claim 36 wherein the amount of said operating pressure increase of said absorber is such that the reduction in energy requirements for heating said generator is greater than energy requirements for operating said compressor.

43. A process for at least one of heating and cooling, including the steps of:

(a) contacting refrigerant vapor with a weak absorbent solution in an absorber unit to produce a rich absorbent solution;

(b) heating said rich absorbent solution in a generator unit to produce said refrigerant vapor and said weak absorbent solution;

(c) returning said weak absorbent solution from step (b) to step (a);

(d) condensing said refrigerant vapor obtained in step (b) to produce a condensate;

(e) expanding said condensate thereby producing said refrigerant vapor;

(f) returning said refrigerant vapor from step (e) to step (a);

(g) transferring heat from a portion of said absorber to a portion of said generator, wherein said absorber portion and said generator portion have overlapping temperature ranges; and (h) increasing the pressure of said refrigerant vapor in at least a portion of said absorber in order to elevate the operating pressure in said portion of said absorber and increase the extent of overlap between temperature ranges of said absorber and said generator.

44. The process in claim 43, wherein said operating pressure of said absorber is increased to an extent such that the reduction in energy requirements for heating said generator is greater than energy requirements for increasing said absorber operating pressure.

45. The process in claim 43 wherein said operating pressure of said absorber is increased in said portion of said absorber.

46. The process in claim 45 wherein approximately 25% of said refrigerant vapor in said absorber is increased in pressure.

47. The process in accordance with claim 43 wherein the step of transferring heat from a portion of said absorber to a portion of said generator is achieved by increasing flow of said rich absorbent solution in at least a portion of said overlapping temperature region of said absorber and said generator.

48. The process in accordance with claim 43 wherein said generator is operated to a peak temperature of approximately 500° F.

49. A process for at least one of heating or cooling by use of an absorption heat pump, comprising the steps of:

(a) contacting refrigerant vapor with a weak absorbent solution in an absorber unit to produce a rich absorbent solution;

(b) heating said rich absorbent solution in a generator unit operating at a peak temperature of approximately 500° F., to produce said refrigerant vapor and said weak absorbent solution;

(c) returning said weak absorbent solution from step (b) to step (a);

(d) condensing said refrigerant vapor obtained in step (b) to produce a condensate;

(e) expanding said condensate thereby producing said refrigerant vapor;

(f) returning said refrigerant vapor from steps (e) to step (a); and (g) transferring heat from a portion of said absorber to a portion of said generator, wherein said absorber portion and said generator portion have overlapping temperature ranges.

50. The process in accordance with claim 49 further comprising the step of:

(h) increasing the pressure of said refrigerant vapor in at least a portion of said absorber in order to elevate the operating pressure in said portion of said absorber and increase the extent of overlap between temperature ranges of said absorber and said generator.

51. The process in accordance with claim 50 wherein said operating pressure of said absorber is increased in said portion of said absorber.

52. The process in accordance with claim 49 wherein the step of transferring heat from a portion of said absorber to a portion of said generator is achieved by increasing flow of said rich absorbent solution in at least a portion of said overlapping temperature region of said absorber and said generator.

53. A process for at least one of heating or cooling by use of an absorption heat pump, comprising the steps of:
 (a) contacting refrigerant vapor with a weak absorbent solution in an absorber unit to produce a rich absorbent solution;
 (b) heating said rich absorbent solution in a generator unit to produce said refrigerant vapor and said weak absorbent solution;
 (c) returning said weak absorbent solution from step (b) to step (a);
 (d) condensing said refrigerant vapor obtained in step (b) to produce a condensate;
 (e) expanding said condensate thereby producing said refrigerant vapor;
 (f) returning said refrigerant vapor from step (e) to step (a); and
 (g) transferring heat from a portion of said absorber to a portion of said generator by increasing flow to said rich absorbent solution in at least a portion of said overlapping temperature region of said absorber and said generator, wherein said absorber portion and said generator portion have overlapping temperature ranges.

54. The process in accordance with claim 53 wherein said generator is operated to a peak temperature of approximately 500° F., thereby further increasing the extent of overlap between temperature ranges of said absorber and said generator.

55. The process in accordance with claim 53 further comprising the step of:
 (h) increasing the pressure of said refrigerant vapor in at least a portion of said absorber in order to elevate the operating pressure in said portion of said absorber and increase the extent of overlap between temperature ranges of said absorber and said generator.

56. The process in accordance with claim 55 wherein said operating pressure of said absorber is increased in said portion of said absorber.

* * * * *